(12) United States Patent
Ono et al.

(10) Patent No.: US 9,399,709 B2
(45) Date of Patent: Jul. 26, 2016

(54) METHOD FOR PRODUCING THERMOPLASTIC ELASTOMER COMPOSITION

(75) Inventors: Shuhei Ono, Ichihara (JP); Nobuhiro Natsuyama, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/587,082

(22) Filed: Aug. 16, 2012

(65) Prior Publication Data

US 2013/0046049 A1 Feb. 21, 2013

(30) Foreign Application Priority Data

Aug. 18, 2011 (JP) ................................. 2011-178920

(51) Int. Cl.
| | |
|---|---|
| *C08L 19/00* | (2006.01) |
| *C08K 3/10* | (2006.01) |
| *C08K 3/16* | (2006.01) |
| *C08K 5/01* | (2006.01) |
| *C08L 23/08* | (2006.01) |
| *C08L 61/06* | (2006.01) |

(52) U.S. Cl.
CPC ............. *C08L 23/0815* (2013.01); *C08K 3/16* (2013.01); *C08K 5/01* (2013.01); *C08L 61/06* (2013.01); *C08L 2312/04* (2013.01)

(58) Field of Classification Search
CPC .................................. C08L 19/00; C08K 3/10
USPC ......................................... 524/502, 509, 515
See application file for complete search history.

(56) References Cited

FOREIGN PATENT DOCUMENTS

| JP | 02-235949 A | | 9/1990 |
| JP | 04-063851 A | | 2/1992 |
| JP | H04-063851 | * | 2/1992 |
| JP | 10-036570 A | | 2/1998 |
| JP | 2012062396 A | * | 3/2012 |

* cited by examiner

*Primary Examiner* — Ling Choi
*Assistant Examiner* — Ronald Grinsted
(74) *Attorney, Agent, or Firm* — Panitch Schwarze Belisario & Nadel LLP

(57) ABSTRACT

Disclosed is a method for producing a thermoplastic elastomer composition, the method comprising subjecting components (A), (B), (C), and (D) to dynamic thermal treatment in a melt-kneading apparatus, wherein the component (A) is an ethylene-α-olefin based copolymer rubber, the component (B) is a polyolefin resin, the component (C) is a liquid in which an alkylphenol resin has been dispersed and/or dissolved in a mineral oil, and the component (D) is a metal halide.

11 Claims, No Drawings

METHOD FOR PRODUCING THERMOPLASTIC ELASTOMER COMPOSITION

BACKGROUND OF THE INVENTION

1. Technical Field

The present invention relates to a method for producing a thermoplastic elastomer composition.

2. Background Art

Olefin-based thermoplastic elastomer compositions have molding processability comparable with that of olefin-based thermoplastic resins and therefore are being used in a broad range of applications, for instance in automotive parts, household electric appliance parts, medical device parts, electric wires, and so on. Such olefin-based thermoplastic elastomer compositions can be obtained by subjecting an olefin-based rubber and a polyolefin-based resin to dynamic thermal treatment in the presence of a crosslinking agent.

As the crosslinking agent, organic peroxides, sulfur, alkylphenol resins, and so on have been used. In some cases, a crosslinking aid is used with the crosslinking agent; compounds having two or more polymerizable double bonds, such as N,N-m-phenylenebismaleimide and trimethylolpropane trimethacrylate, metal halides, such as stannous chloride and ferric chloride, metal oxides, such as zinc oxide and magnesium oxide, and so on have been used as such a crosslinking aid.

As a method for producing such an olefin-based thermoplastic elastomer composition, for example, JP 2-235949 A has disclosed a method in which a component composed of a polypropylene-based resin, an ethylene-propylene-ethylidene norbornene copolymer rubber, a paraffinic oil, and stannous chloride and an alkylphenol resin is fed into a Banbury mixer, and then the polypropylene-based resin, the ethylene-propylene-ethylidene norbornene copolymer rubber, and the paraffinic oil are subjected to dynamic thermal treatment in the presence of the alkylphenol resin, which is a crosslinking agent, and the stannous chloride, which is a crosslinking accelerator, in the Banbury mixer.

However, in the case where an alkylphenol resin has been used as a crosslinking agent, an extruded sheet of the resulting thermoplastic elastomer may have poor appearance.

SUMMARY OF THE INVENTION

Under such circumstances, the problem to be solved by the present invention is to provide a method for producing a thermoplastic elastomer composition capable of affording an extruded sheet with improved appearance, the method using an alkylphenol resin as a crosslinking agent.

The present invention relates to a method for producing a thermoplastic elastomer composition, the method comprising subjecting components (A), (B), (C), and (D) to dynamic thermal treatment in a melt-kneading apparatus, wherein the component (A) is an ethylene-α-olefin based copolymer rubber, the component (B) is a polyolefin resin, the component (C) is a liquid in which an alkylphenol resin has been dispersed and/or dissolved in a mineral oil, and the component (D) is a metal halide.

According to the present invention, it is possible to produce a thermoplastic elastomer composition capable of affording an extruded sheet with improved appearance by using an alkylphenol resin as a crosslinking agent. Moreover, it is also possible to produce an extruded sheet with improved appearance by extruding a thermoplastic elastomer composition produced by that method.

DESCRIPTION OF THE PREFERRED EMBODIMENTS

The component (A) is an ethylene-α-olefin-base copolymer rubber. The ethylene-α-olefin-based copolymer rubber is a copolymer with an A hardness defined in JIS K6253 (1997) of 85 or less, the copolymer having monomer units derived from ethylene (namely, ethylene units) and monomer units derived from an α-olefin having 3 to 10 carbon atoms (namely, α-olefin units having 3 to 10 carbon atoms). Examples of the α-olefin having 3 to 10 carbon atoms include propylene, 1-butene, 2-methylpropylene, 1-pentene, 3-methyl-1-butene, 1-hexene, 4-methyl-1-pentene, and 1-octene; the ethylene-α-olefin-based copolymer rubber of the component (A) may contain one or more kinds of α-olefin. Propylene and 1-butene are preferred as the α-olefin having 3 to 10 carbon atoms, and propylene is more preferred.

The ethylene-α-olefin-based copolymer rubber may have one or more kinds of monomer units derived from other monomers in addition to the ethylene units and the α-olefin units having 3 to 10 carbon atoms. Examples of such other monomers include conjugated dienes having 4 to 8 carbon atoms, such as 1,3-butadiene, 2-methyl-1,3-butadiene (namely, isoprene), 1,3-pentadiene, and 2,3-dimethyl-1,3-butadiene; nonconjugated dienes having 5 to 15 carbon atoms, such as dicyclopentadiene, 5-ethylidene-2-norbornene, 1,4-hexadiene, 1,5-dicyclooctadiene, 7-methyl-1,6-octadiene, and 5-vinyl-2-norbornene; vinyl ester compounds, such as vinyl acetate; unsaturated carboxylic acid esters, such as methyl acrylate, ethyl acrylate, butyl acrylate, methyl methacrylate, and ethyl methacrylate; and unsaturated carboxylic acids, such as acrylic acid and methacrylic acid. 5-Ethylidene-2-norbornene and dicyclopentadiene are preferred.

The content of the ethylene units of the ethylene-α-olefin-base copolymer rubber is usually 30 to 85% by weight, preferably 40 to 80% by weight; the content of the α-olefin units having 3 to 10 carbon atoms is usually 5 to 70% by weight, preferably 15 to 60% by weight; and the content of other monomer units other than the ethylene units and the α-olefin units is usually 0 to 30% by weight, preferably 0 to 20% by weight. The overall amount of the monomer units in the ethylene-α-olefin-based copolymer rubber is considered to be 100% by weight.

Examples of the ethylene-α-olefin-based copolymer rubber include ethylene-propylene copolymer rubbers, ethylene-1-butene copolymer rubbers, ethylene-1-hexene copolymer rubbers, ethylene-1-octene copolymer rubbers, ethylene-propylene-1-butene copolymer rubbers, ethylene-propylene-1-hexene copolymer rubbers, ethylene-propylene-1-octene copolymer rubbers, ethylene-propylene-5-ethylidene-2-norbornene copolymer rubbers, ethylene-propylene-dicyclopentadiene copolymer rubbers, ethylene-propylene-1,4-hexadiene copolymer rubbers, and ethylene-propylene-5-vinyl-2-norbornene copolymer rubbers. As the component (A), one or more kinds of ethylene-α-olefin-based copolymer rubber may be used. Preferred are ethylene-propylene copolymers whose content of ethylene units is 40 to 80 parts by weight and content of propylene units is 20 to 60 parts by weight (where the sum total of the content of ethylene units and the content of propylene units is 100 parts by weight) or ethylene-propylene-5-ethylidene-2-norbornene copolymers whose content of ethylene units is 40 to 79.9 parts by weight, content of propylene units is 20 to 59.9 parts by weight, and content of 5-ethylidene-2-norbornene units is 0.1 to 20 parts by weight (where the sum total of the content of ethylene units, the content of propylene units, and the content of 5-ethylidene-2-norbornene units is 100 parts by weight).

In order to enhance the mechanical strength of a thermoplastic elastomer composition molded article, the Mooney viscosity ($ML_{1+4}100°$ C.) of the ethylene-α-olefin-based copolymer rubber is preferably 10 or more, more preferably 30 or more. In order to improve the appearance of the molded article, it is preferably 350 or less, more preferably 300 or less. The Mooney viscosity ($ML_{1+4}100°$ C.) is measured in accordance with JIS K6300 (1994). The Mooney viscosity of an ethylene-α-olefin-based copolymer rubber can be adjusted by controlling, for example, the polymerization temperature, the added amount of hydrogen, the polymerization time, and the proportions of the amounts of the components to constitute a catalyst.

In order to enhance the mechanical strength of a thermoplastic elastomer composition molded article, the intrinsic viscosity of the ethylene-α-olefin-based copolymer rubber measured in 135° C. Tetralin is preferably 0.5 dl/g or more, more preferably 1 dl/g or more. In order to improve the appearance of the molded article, it is preferably 8 dl/g or less, more preferably 6 dl/g or less. The intrinsic viscosity of an ethylene-α-olefin-based copolymer rubber can be adjusted by controlling, for example, the polymerization temperature, the added amount of hydrogen, the polymerization time, and the ratio of the amounts of the components to constitute a catalyst.

The ethylene-α-olefin-based copolymer rubber can be produced by conventional methods.

The component (B) is a polyolefin-based resin. Polyolefin-based resins are polymers containing 50% by weight or more of repeating units derived from one sort or two or more sorts of olefin having 2 to 10 carbon atoms, such as ethylene, propylene, 1-butene, and 1-hexene and having an A hardness of JIS K6253 (1997) being higher than 98. Such polyolefin-based resins include homopolymers or copolymers of ethylene, propylene, 1-butene, 1-pentene, 1-hexene, 4-methyl-1-pentene, 1-octene, and 1-decene. Polypropylene-based resins are preferred.

Polypropylene-based resins are crystalline polymers whose content of monomer units derived from propylene (i.e., propylene units) contained therein is 50 to 100% by weight where the overall amount of the monomer units is considered to be 100% by weight. Preferably, the content of the propylene units in a polymer is 80 to 100 parts by weight. Crystalline polymers are polymers with which a crystal melting peak is observed within a temperature range of from −50° C. to 200° C. in differential scanning calorimetry (DSC) measurement in accordance with JIS K7122 (1987) and the heat of crystal fusion of the peak exceeds 30 J/g.

Examples of such polypropylene-based resins include propylene homopolymers, and copolymers of propylene with at least one comonomer selected from the comonomer group consisting of ethylene and α-olefins having 4 to 10 carbon atoms (e.g., 1-butene, 1-hexene, 1-pentene, 1-octene, and 4-methyl-1-pentene). Such copolymers may be either random copolymers or block copolymers. Examples of such copolymers include propylene-ethylene copolymers, propylene-1-butene copolymers, propylene-1-hexene copolymers, propylene-1-octene copolymers, propylene-ethylene-1-butene copolymers, and ethylene-propylene-1-hexene copolymers. Preferred as a polypropylene-based resin are propylene homopolymers, propylene-ethylene copolymers, and propylene-1-butene copolymers.

Examples of the structural configuration of polypropylene-based resins include isotactic structure, syndiotactic structure, and structure in which the preceding structures are mixed. It is preferred that the main structure is isotactic structure.

Polypropylene-based resins can be produced by conventional polymerization methods using a Ziegler Natta catalyst, a metallocene catalyst, or the like. Examples of such polymerization methods include solution polymerization, bulk polymerization, slurry polymerization, and vapor phase polymerization.

The melt flow rate (measured under a load of 21.18 N at a temperature of 230° C. in accordance with JIS K7210) of a polypropylene-based resin is preferably 0.1 to 300 g/10 min, more preferably 0.5 to 200 g/10 min. The melt flow rate of a polypropylene-based resin can be adjusted by controlling polymerization temperature, the amount of hydrogen to be added, polymerization time, and the ratio of the amounts of components constituting a catalyst to be used.

The component (C) is a liquid in which an alkylphenol resin has been dispersed and/or dissolved in a mineral oil. Examples of the alkylphenol resin include compounds represented by the following formula generally used as a crosslinking agent for rubber (see U.S. Pat. Nos. 3,287,440 and 3,709,840):

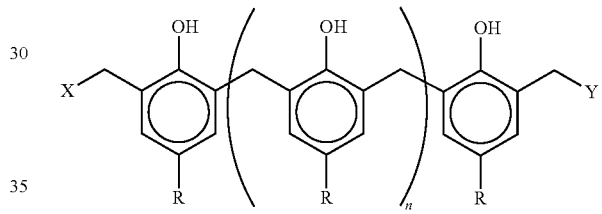

wherein n represents an integer of 0 to 10, X and Y each independently represent a hydroxyl group, a halogenated alkyl group, or a halogen atom, and R represents a saturated hydrocarbon group having 1 to 15 carbon atoms. Examples of the alkylphenol resin include alkylphenol-formaldehyde and brominated alkylphenol-formaldehyde. Alkylphenol resins having a methylol group are preferred.

Compounds represented by the formula given above can be produced by causing a substituted phenol and an aldehyde to undergo condensation polymerization using an alkaline catalyst. Usually, the form of the alkylphenol resin is solid.

The alkylphenol resin is preferably used in combination with a dispersing agent like metal oxides and stearic acid.

In this production method, a liquid (C) in which an alkylphenol resin has been dispersed and/or dissolved in a mineral oil is fed to a melt-kneading apparatus.

Examples of the mineral oil contained in the component (C) include aromatic mineral oils, naphthenic mineral oils, and paraffinic mineral oils. From the viewpoint of the property of coloring a thermoplastic elastomer composition, the mineral oil contained in the component (C) is preferably a paraffinic mineral oil.

Preferably, the mineral oil has a kinetic viscosity at 40° C. of 1.0 to 500 $mm^2$/sec. From the viewpoint of the storage stability of the component (C), the kinetic viscosity at 40° C. is more preferably 2.0 to 250 $mm^2$/sec, and even more preferably 3.0 to 90 $mm^2$/sec. The kinetic viscosity at 40° C. is a viscosity index measured in accordance with JIS K 2283.

As for the mineral oil contained in the component (C), the proportion of aromatic carbon determined by a ring analysis is preferably 20% $C_A$ or less, and from the viewpoint of the property of coloring the thermoplastic elastomer composition, it is more preferably 5% $C_A$ or less, and even more preferably 2% $C_A$ or less. It is particularly preferable that that proportion of aromatic carbon is 0% $C_A$. The proportion of aromatic carbon (% $C_A$) as used herein is the proportion (percentage) of the number of aromatic carbon atoms to the number of all carbon atoms determined by the method in accordance with ASTM D 3238(i.e., the n-d-M ring analysis).

In the mineral oil contained in the component (C), the sulfur content is preferably 0.7% by weight or less, more preferably 0.2% by weight or less, and even more preferably 0.1% by weight or less.

The content of the alkylphenol resin in the component (C) is preferably 1.0% by weight to 50% by weight, more preferably 2.0% by weight to 45% by weight, and even more preferably 3.0% by weight to 40% by weight where the overall amount of the component (C) is considered to be 100% by weight.

The method of dispersing and/or dissolving an alkylphenol resin in a mineral oil may be a method in which the alkylphenol resin and the mineral oil are fed at once into a glass container equipped with a stirrer and they are heated under stirring on a water bath of 70 to 100° C. for 2 to 5 hours. From the viewpoint of discoloration of the solution, stirring temperature is preferably 70 to 90° C.

The hue of the solution is judged in accordance with JIS K0071; the APHA value is preferably 500 or less and more preferably 400 or less.

The component (D) is a metal halide. Examples of the metal halide include stannous chloride anhydride, stannous chloride dihydrate, and ferric chloride. From the viewpoint of reactivity, stannous chloride dihydrate is preferred. The form of component (D) is usually a powder.

The component (E) is a mineral oil, examples of which include aromatic mineral oils, naphthenic mineral oils, and paraffinic mineral oils. Paraffinic mineral oils are preferred. Mineral oils with a kinetic viscosity at 40° C. of 10 to 1000 mm²/sec are preferred, and those with a kinetic viscosity at 40° C. of 15 to 800 mm²/sec are more preferred. Kinetic viscosity is measured in accordance with JIS K2283-3.

In the present production method, the ethylene-α-olefin-based copolymer rubber of the component (A) may be used in the form of an oil-extended ethylene-α-olefin-based copolymer rubber containing a mineral oil. Examples of the method of blending a mineral oil to an ethylene-α-olefin-based copolymer rubber include (1) a method in which both the materials are kneaded mechanically by using a kneading machine such as a roll and a Banbury mixer, and (2) a method in which the mineral oil is added to a solution of the ethylene-α-olefin-based copolymer rubber and then the solvent is removed by steam stripping or the like.

Examples of the above-mentioned additive include antioxidants, heat stabilizers, light stabilizers, UV absorbers, release agents, tackifiers, colorants, neutralizers, lubricants, dispersing agents, flame retardants, antistatic agents, conductivity imparting agents, antibacterial agents, germicides, carbon black, talc, clay, silica, inorganic fillers, such as glass fiber, and organic fibers.

In the present production method, the following component (E) and/or an additive in addition to the components (A) and (B) may be subjected to dynamic thermal treatment in the presence of the components (C) and (D). The "dynamic thermal treatment" referred to herein means treatment involving melt-kneading under shearing force.

As the melt-kneading apparatus for performing such dynamic thermal treatment, conventional machines, such as mixing rolls, which are of opened type, and Banbury mixers, kneaders, single screw extruders and twin screw extruders, which are of closed type, can be used. Alternatively, it is also permitted to combine two or more types of apparatuses. A twin screw extruder is preferred.

In order to enhance the softness of the thermoplastic elastomer composition, the amount of the component (A) to be subjected to dynamic thermal treatment is preferably 10 parts by weight or more, more preferably 15 parts by weight or more where the total amount of the components (A), (B), and (E) is considered to be 100 parts by weight. In order to increase the flowability of the thermoplastic elastomer composition and improve the appearance of molded articles made of the thermoplastic elastomer composition, the amount of the component (A) is preferably 60 parts by weight or less, more preferably 55 parts by weight or less.

In order to increase the flowability of the thermoplastic elastomer and improve the appearance of molded articles of the thermoplastic elastomer composition, the amount of the component (B) to be subjected to dynamic thermal treatment is preferably 5 parts by weight or more, more preferably 10 parts by weight or more where the total amount of the components (A), (B) and (E) is considered to be 100 parts by weight. In order to improve the flexibility of the thermoplastic elastomer composition, the amount of the component (B) is preferably 50 parts by weight or less, and more preferably 45 parts by weight or less.

In order to increase the degree of crosslinking of the thermoplastic elastomer composition, the amount of the component (C) to be subjected to dynamic thermal treatment is preferably 0.5 to 100 parts by weight, more preferably 1 to 90 parts by weight per 100 parts by weight in total of the components (A), (B), and (E).

In order to increase the degree of crosslinking of the thermoplastic elastomer composition, the amount of the component (D) to be subjected to dynamic thermal treatment is preferably 0.1 to 20 parts by weight, more preferably 0.2 to 15 parts by weight where the total amount of the components (A), (B), and (E) is considered to be 100 parts by weight.

The amount of the component (E) to be subjected to the dynamic thermal treatment is preferably 5 parts by weight or more for enhancing the flowability of the thermoplastic elastomer and improving the appearance of molded articles of the thermoplastic elastomer composition where the total amount of the components (A), (B), and (E) is considered to be 100 parts by weight. In order to improve the appearance of molded articles of the thermoplastic elastomer composition, the amount of the component (E) is preferably 70 parts by weight or less, and more preferably 65 parts by weight or less.

The temperature of the dynamic thermal treatment is usually 150 to 300° C., and preferably 170 to 280° C., and the time of the dynamic thermal treatment is usually 0.1 to 30 minutes, and preferably 0.2 to 20 minutes.

As to the method of feeding the component (C) to be subjected to dynamic thermal treatment, it is preferable to feed it to a twin screw extruder continuously by means of an oil pump of a crosslinking agent supplier. Such continuous feed of the component (C) to a melt-kneading apparatus such as an extruder can suppress variation with time of the rate of feed of the component (C) and exhibits an effect of improving the appearance of molded articles made of a thermoplastic elastomer composition.

The thermoplastic elastomer composition obtained by the present invention is shaped using commonly employed molding methods, such as injection molding, extrusion forming, hollow molding, and compression molding. The thermoplastic elastomer composition is used as an industrial material in a broad range of fields for applications such as automotive parts (e.g., weather strips, ceiling materials, interior sheets, bumper moldings, side moldings, air spoilers, air duct hoses, cup holders, side brake grips, shift knobs covers, seat adjustment latches, flapper door seals, wire harness grommets, rack and pinion boots, suspension cover boots, glass guides, inner beltline seals, roof guides, trunk lid seals, molded quarter window gaskets, corner moldings, glass encapsulation, hood seals, glass run channels, secondary seals, various packings), building parts (e.g., water stops, joint sealers, building window frames), sports instruments (e.g., golf clubs, tennis racket grips), industrial parts (e.g., hose tubes, gaskets), household electric appliance parts (e.g., hoses, packings), medical device parts, electric wires, and miscellaneous goods.

EXAMPLES

The present invention is described in more detail below by Examples.

The raw materials and the evaluation methods used in the following Examples are as follows.

[Raw Materials Used]

Components (A), (E): Oil-extended rubber prepared by adding 100 parts by weight of paraffinic mineral oil to 100 parts by weight of ethylene-propylene-5-ethylidene-2-norbornene copolymer rubber (Mooney viscosity ($ML_{1+4}$ 100° C.)=63, the content of ethylene units=66% by weight, the content of 5-ethylidene-2-norbornene units=4% by weight)

Component (B): Polypropylene resin (propylene homopolymer, produced by Sumitomo Chemical Co., Ltd., commercial name: NOBLEN D101, MFR (230° C., 21.18 N)=0.7 g/10 min)

Component (C): Alkylphenol-formaldehyde condensate (produced by Taoka Chemical Co., Ltd., commercial name: Tackirol 201)

Component (D): Stannous chloride dihydrate (produced by Nihon Kagaku Sangyo Co., Ltd.)

Component (E): Paraffinic mineral oil (produced by Idemitsu Kosan Co., Ltd., commercial name: Diana Process Oil)

Antioxidant: Phenolic antioxidant (produced by Ciba Japan K.K., commercial name: IRGANOX 1010)

The mineral oils used for dispersing and/or dissolving alkylphenol resins are as follows.

Paraffinic oil-1 (Diana Process Oil PW32, kinetic viscosity (40° C.)=30.9 mm$^2$/sec, % $C_A$=0, sulfur content=7 ppm, produced by Idemitsu Kosan, Inc.)

Paraffinic oil-2 (Diana Process Oil PW90, kinetic viscosity (40° C.)=95.5 mm$^2$/sec, % $C_A$=0, sulfur content=10 ppm, produced by Idemitsu Kosan, Inc.)

Paraffinic oil-3 (Diana Process Oil PW380, kinetic viscosity (40° C.)=381.6 mm$^2$/sec, % $C_A$=0, sulfur content=6 ppm, produced by Idemitsu Kosan, Inc.)

Paraffinic oil-4 (Diana Process Oil PS32, kinetic viscosity (40° C.)=31.4 mm$^2$/sec, % $C_A$=0.1, sulfur content=0.01 wt %, produced by Idemitsu Kosan, Inc.)

Paraffinic oil-5 (Diana Process Oil PS90, kinetic viscosity (40° C.)=92.4 mm$^2$/sec, % $C_A$=0.2, sulfur content=0.01 wt %, produced by Idemitsu Kosan, Inc.)

Paraffinic oil-6 (Sunpar 115, kinetic viscosity (40° C.)=30.0 mm$^2$/sec, % $C_A$=2, sulfur content=0.13 wt %, produced by Japan Sun Oil Co., Ltd.)

Paraffinic oil-7 (Sunpar 150, kinetic viscosity (40° C.)=92.6 mm$^2$/sec, % $C_A$=3, sulfur content=0.01 wt %, produced by Japan Sun Oil Co., Ltd.)

Paraffinic oil-8 (Koumorex H30, kinetic viscosity (40° C.)=94.7 mm$^2$/sec, % $C_A$=4.8, sulfur content=0.57 wt %, produced by NIPPON OIL CORP.)

[Method of Evaluation]

(1) Method of Evaluation of Storage Stability

A liquid prepared by heating a mineral oil and an alkylphenol resin at 80° C., thereby dispersing and/or dissolving the resin was charged into colorless, transparent bottles and then stored in a thermostat of 23° C. and 10° C. for 24 hours. Then, the condition of dispersion and dissolution of the alkylphenol resin in the liquid were judged visually. The case where the alkylphenol resin had been dispersed or dissolved into the liquid was judged as "storage stability is excellent" and is indicated by a code "1." The case where alkylphenol resin had precipitated partly in the liquid was judged as "storage stability is good" and is indicated by a code "2." The case where the alkylphenol resin had precipitated completely in the liquid was judged as "storage stability is poor" and is indicated by a code "3." Hue (APHA) was judged in accordance with JIS K0071.

(2) Appearance of Extruded Sheet

Using a USV type 25-mmφ extruder manufactured by Union Plastics Co. Ltd., equipped with a full flight screw and a T-shaped die, a 0.2-mm thick extruded sheet was produced. A lump with a diameter of 0.5 mm or more being present in the extruded sheet was judged to be a seed, and the condition of the appearance of the sheet was judged on the basis of the number of seeds found in a randomly selected area with a size of 40 cm in length and 8 cm in width of the extruded sheet. The case where the surface of the sheet was smooth and the number of seeds was up to 20 was judged as "good" and indicated by a code "2", and the case where the surface of the sheet was rough and the number of seeds was more than 20 was judged as "bad" and indicated by a code "3."

(4) Method of Physical Property Evaluation

A 2-mm thick specimen was prepared by compression molding a thermoplastic elastomer composition at 200° C., and then physical property measurement was carried out by the following methods.

Hardness: A Shore-A instantaneous value was measured in accordance with JIS K6253.

Tensile properties: In accordance with JIS K6251, using a specimen taken from a thermoplastic elastomer composition plate with a JIS #3 dumbbell cutter, a tensile strength test was carried out, whereby a tensile strength at break and a tensile elongation at break were determined.

Permanent compression set: In accordance with JIS K6262, a permanent compression set was measured under conditions including a compression ratio of 25%, a retention temperature of 70° C., and a retention time of 22 hours.

Oil resistance: In accordance with JIS K6258, a sample was immersed in JIS #3 oil of 100° C. for 22 hours, and then a weight change relative to the weight before the immersion was calculated, which was used as a measure of oil resistance.

Heat aging resistance: In accordance with JIS K6257, heat aging resistance was evaluated by holding a sample at 150° C. for 168 hours.

[Preparation of Thermoplastic Elastomer Composition]

Example 1

To a twin screw extruder were fed continuously 77 parts by weight of pulverized oil extended rubber, 23 parts by weight of polypropylene resin pellets, 0.1 parts by weight of a phenolic antioxidant powder, 8 parts by weight of a liquid in which an alkylphenol resin had been dissolved in a paraffinic mineral oil (PW32) in a concentration of 30% by weight, and 0.6 parts by weight of stannous chloride dihydrate, followed by dynamic thermal treatment at 200±10° C., whereby a thermoplastic elastomer composition was obtained. The results are shown in Table 1.

Example 2

To a twin screw extruder were fed continuously 77 parts by weight of pulverized oil extended rubber, 23 parts by weight of polypropylene resin pellets, 0.1 parts by weight of a phenolic antioxidant powder, 8 parts by weight of a liquid in which an alkylphenol resin had been dissolved in a paraffinic mineral oil (PW90) in a concentration of 20% by weight, and 0.6 parts by weight of stannous chloride dihydrate, followed by dynamic thermal treatment at 200±10° C., whereby a thermoplastic elastomer composition was obtained. The results are shown in Table 1.

Example 3

To a twin screw extruder were fed continuously 62 parts by weight of pulverized oil extended rubber, 24 parts by weight of polypropylene resin pellets, 14 parts by weight of paraffinic mineral oil, 0.1 parts by weight of a phenolic antioxidant powder, 5 parts by weight of a liquid in which an alkylphenol resin had been dissolved in a paraffinic mineral oil (PW32) in a concentration of 32% by weight, and 2.4 parts by weight of a mixture of polypropylene powder and stannous chloride dihydrate powder (2.0 parts by weight of polypropylene powder and, 0.4 parts by weight of stannous chloride dihydrate powder), followed by dynamic thermal treatment at 200±10° C., whereby a thermoplastic elastomer composition was obtained.

Example 4

Operations were carried out in the same manner as Example 3 except that PS32 was used as the mineral oil contained in component (C).

Example 5

Operations were carried out in the same manner as Example 3 except that SUNPAR115 was used as the mineral oil contained in component (C).

Example 6

Operations were carried out in the same manner as Example 3 except that PW90 was used as the mineral oil contained in component (C).

Example 7

Operations were carried out in the same manner as Example 3 except that PS90 was used as the mineral oil contained in component (C).

Example 8

Operations were carried out in the same manner as Example 3 except that SUNPAR150 was used as the mineral oil contained in component (C).

Example 9

Operations were carried out in the same manner as Example 3 except that Koumorex H30 was used as the mineral oil contained in component (C).

Comparative Example 1

Operations were carried out in the same manner as Example 1 except that 8 parts by weight of the liquid in which an alkylphenol resin had been dissolved in a paraffinic mineral oil (PW32) in a concentration of 30% by weight was replaced by 2.4 parts by weight of an alkylphenol resin powder.

[Condition of Liquid in Which Alkylphenol Resin has been Dispersed and/or Dissolved]

Test Example 1

In a sealed glass container, 20 parts by weight of an alkylphenol resin and 80 parts by weight of a paraffinic mineral oil (PW32) were stirred and mixed under heating. The storage stability of the resulting mixed liquid was evaluated; the storage stability was excellent at 23° C. and also excellent at 10° C. The APHA value was 40.

Test Example 2

In a sealed glass container, 20 parts by weight of an alkylphenol resin and 80 parts by weight of a paraffinic mineral oil (PW90) were stirred and mixed under heating. The storage stability of the resulting mixed liquid was evaluated; the storage stability was excellent at 23° C. and good at 10° C. The APHA value was 40.

Test Example 3

In a sealed glass container, 20 parts by weight of an alkylphenol resin and 80 parts by weight of a paraffinic mineral oil (PW380) were stirred and mixed under heating. The storage stability of the resulting mixed liquid was evaluated; the storage stability was excellent at 23° C. and good at 10° C. The APHA value was 40.

Test Example 4

In a sealed glass container, 20 parts by weight of an alkylphenol resin and 80 parts by weight of a paraffinic mineral oil (PS32) were stirred and mixed under heating. The storage stability of the resulting mixed liquid was evaluated; the storage stability was excellent at 23° C. and also excellent at 10° C. The APHA value was 30.

Test Example 5

In a sealed glass container, 20 parts by weight of an alkylphenol resin and 80 parts by weight of a paraffinic mineral oil (PS90) were stirred and mixed under heating. The storage stability of the resulting mixed liquid was evaluated; the storage stability was excellent at 23° C. and good at 10° C. The APHA value was 30.

Test Example 6

In a sealed glass container, 20 parts by weight of an alkylphenol resin and 80 parts by weight of a paraffinic mineral oil (SUNPER115) were stirred and mixed under heating. The storage stability of the resulting mixed liquid was evaluated; the storage stability was excellent at 23° C. and also excellent at 10° C. The APHA value was 300.

Test Example 7

In a sealed glass container, 20 parts by weight of an alkylphenol resin and 80 parts by weight of a paraffinic mineral oil (SUNPER150) were stirred and mixed under heating. The storage stability of the resulting mixed liquid was evaluated; the storage stability was excellent at 23° C. and good at 10° C. The APHA value was 500 or more.

Test Example 8

In a sealed glass container, 20 parts by weight of an alkylphenol resin and 80 parts by weight of a paraffinic mineral oil (Koumorex H30) were stirred and mixed under heating. The storage stability of the resulting mixed liquid was evaluated; the evaluated result was excellent at 23° C. and good at 10° C. The APHA value was 500 or more.

Test Example 9

In a sealed glass container, 20 parts by weight of an alkylphenol resin and 80 parts by weight of water were stirred and mixed under heating. The storage stability of the resulting mixed liquid was evaluated; the storage stability was poor both at 23° C. and at 10° C.

TABLE 1

| Configuration | | | Example 1 | Example 2 | Comparative Example 1 |
|---|---|---|---|---|---|
| Configuration | (A) Ethylene-α-olefin copolymer rubber | | 77 | 77 | 77 |
| | (E) Mineral oil | | | | |
| | (B) Polypropylene | | 23 | 23 | 23 |
| | (C) Liquid in which alkylphenol resin has been dispersed and/or dissolved in mineral oil | | 8 | 12 | — |
| | Alkylphenol resin | | — | — | 2.4 |
| | (D) Metal halide | | 0.6 | 0.6 | 0.6 |
| Hardness | Instantaneous value | | 83 | 81 | 86 |
| Tensile strength test | Strength at break | MPa | 13.3 | 13.0 | 11.8 |
| | Elongation at break | % | 660 | 650 | 510 |
| Permanent compression set (70° C., 22 h) | | % | 36 | 34 | 33 |
| Oil resistance ΔW (100° C., 22 h) | | % | 100 | 96 | 89 |
| Evaluation of sheet appearance (The number of seeds) | | | 2 (15) | 2 (20) | 3 (more than 100) |

TABLE 2

| | Example | | | | | | |
|---|---|---|---|---|---|---|---|
| | 3 | 4 | 5 | 6 | 7 | 8 | 9 |
| Mineral oil | PW32 | PS32 | SUNPAR115 | PW90 | PS90 | SUNPAR150 | Koumorex H30 |
| Kinetic viscosity (mm$^2$/s) | 30.9 | 31.4 | 30.0 | 95.5 | 92.4 | 92.6 | 94.7 |
| Ring analysis (% CA) | 0 | 0.1 | 2 | 0 | 0.2 | 3 | 4.8 |
| Sulfur content | 7 ppm | 0.01 wt % | 0.13 wt % | 10 ppm | 0.01 wt % | 0.01 wt % | 0.57 wt % |
| Hue (APHA) | 40 | 300 | 300 | 40 | 300 | 500 or more | 500 or more |
| Evaluation of storage stability at 23° C. | 1 | 1 | 1 | 1 | 1 | 1 | 1 |
| Evaluation of storage stability at 10° C. | 1 | 1 | 1 | 2 | 2 | 2 | 1 |
| Physical property of TPE | | | | | | | |
| Hardness (instantaneous value) | 73 | 74 | 74 | 73 | 74 | 74 | 73 |
| Tensile strength at break (MPa) | 12.1 | 12.0 | 11.8 | 11.6 | 11.7 | 13.3 | 10.2 |
| Tensile elongation at break (%) | 550 | 480 | 520 | 540 | 550 | 560 | 480 |
| Permanent compression set (70° C. × 22 h) | 24 | 27 | 25 | 24 | 25 | 25 | 25 |
| Oil resistance ΔW (100° C. × 22 h) | 69 | 71 | 72 | 77 | 79 | 81 | 82 |
| Evaluation of sheet appearance | 2 | 2 | 2 | 2 | 2 | 2 | 2 |
| The number of seeds (Seeds/40 cm) | 12 | 15 | 20 | 7 | 13 | 11 | 15 |
| Heat aging resistance | | | | | | | |
| Tensile strength retention (%) | 98 | 93 | 86 | 97 | 91 | 88 | 82 |
| Tensile elongation retention (%) | 91 | 92 | 87 | 96 | 91 | 91 | 83 |

What is claimed is:

1. A method for producing a thermoplastic elastomer composition, the method comprising subjecting components (A), (B), (C), and (D) to dynamic thermal treatment in a melt-kneading apparatus, wherein the component (A) is an ethylene-α-olefin based copolymer rubber, the component (B) is a polyolefin resin, the component (C) is a liquid in which an alkylphenol resin has been dispersed and/or dissolved in a mineral oil, and the component (D) is a metal halide.

2. The method for producing a thermoplastic elastomer composition according to claim 1, wherein the components (A), (B), (C), and (D) and component (E) are subjected to dynamic thermal treatment in the melt-kneading apparatus, wherein the component (E) is a mineral oil.

3. The method for producing a thermoplastic elastomer composition according to claim 1, wherein the mineral oil contained in the component (C) is a paraffinic mineral oil.

4. The method for producing a thermoplastic elastomer composition according to claim 1, wherein the mineral oil contained in the component (C) contains aromatic carbon in a proportion determined by a ring analysis of 20% $C_A$ or less.

5. The method for producing a thermoplastic elastomer composition according to claim 1, wherein the component (C) contains the alkylphenol resin in a content of 1.0% by weight to 50% by weight where the total amount of the component (C) is 100% by weight.

6. The method for producing a thermoplastic elastomer composition according to claim 1, wherein the melt-kneading apparatus is a twin screw extruder and the component (C) is fed to the twin screw extruder continuously.

7. The method for producing a thermoplastic elastomer composition according to claim 1, wherein 10 parts by weight to 60 parts by weight of the component (A), 5 parts by weight to 50 parts by weight of the component (B), 0.5 parts by weight to 100 parts by weight of the component (C), 0.1 parts by weight to 20 parts by weight of the component (D), and 0 part by weight to 70 parts by weight of the component (E) are subjected to dynamic thermal treatment where the total amount of the component (A), the component (B), and the component (E) is 100 parts by weight.

8. The method for producing a thermoplastic elastomer composition according to claim 1, wherein the mineral oil contained in the component (C) has a kinetic viscosity at 40° C. of 1.0 to 500 $mm^2$/sec.

9. The method for producing a thermoplastic elastomer composition according to claim 1, wherein the intrinsic viscosity of the ethylene-α-olefin based copolymer rubber of the component (A) measured in 135° C. tetralin is 0.5 dl/g or more.

10. The method for producing a thermoplastic elastomer composition according to claim 1, wherein the intrinsic viscosity of the ethylene-α-olefin based copolymer rubber of the component (A) measured in 135° C. tetralin is 8 dl/g or less.

11. The method for producing a thermoplastic elastomer composition according to claim 1, wherein the polyolefin resin of the component (B) has an A hardness of JIS K6253 (1997) of higher than 98.

* * * * *